(No Model.)  2 Sheets—Sheet 2.
E. R. MOORE.
ELECTRICAL CONDUCTING TRAMWAY AND TRUCK.
No. 262,971.  Patented Aug. 22, 1882.
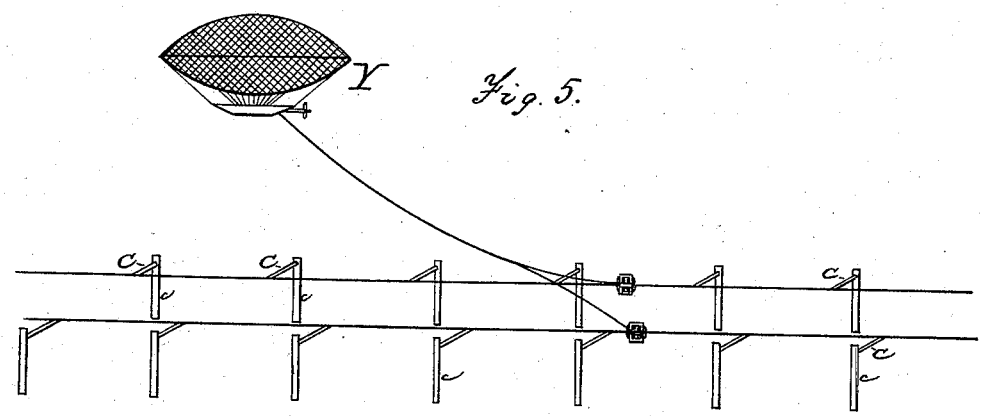
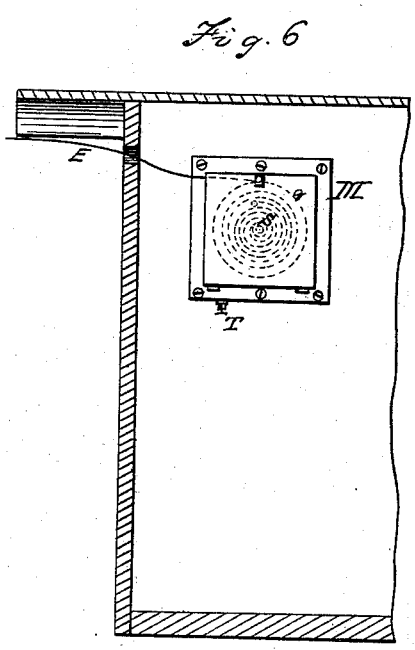
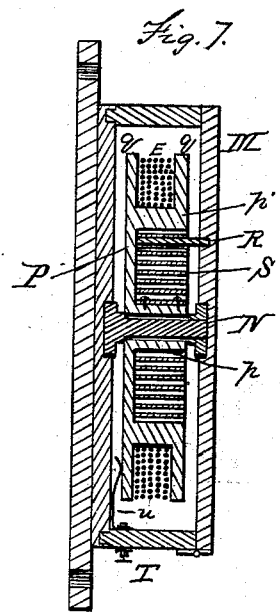
Witnesses,
Phil. W. Hale.
Thos. J. Godwin
Inventor,
Edwin R. Moore,
per W. B. Hale, Attorney

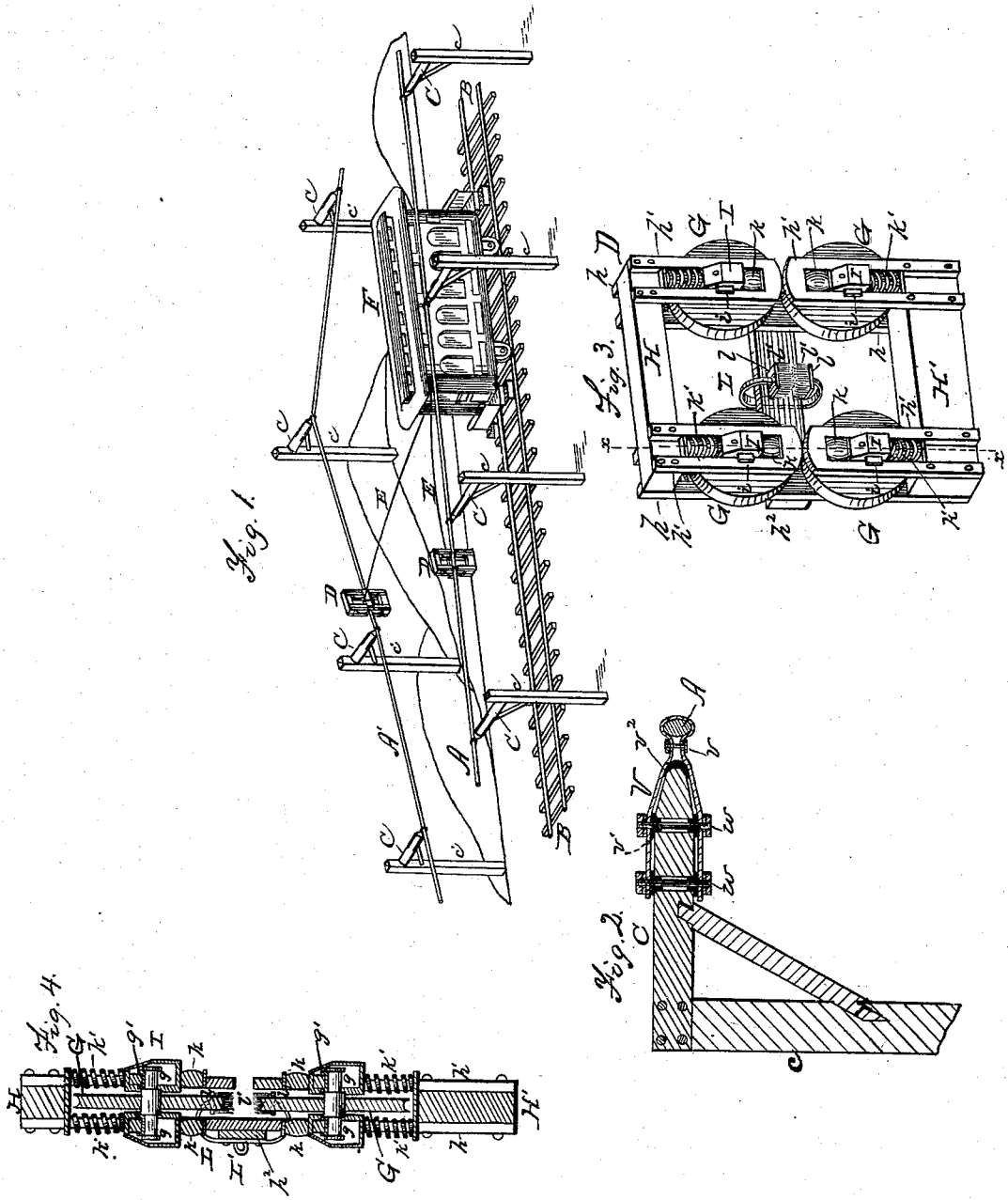

UNITED STATES PATENT OFFICE.

EDWIN R. MOORE, OF ST. PETER, MINNESOTA.

ELECTRICAL CONDUCTING TRAMWAY AND TRUCK.

SPECIFICATION forming part of Letters Patent No. 262,971, dated August 22, 1882.

Application filed March 21, 1882. (No model.)

*To all whom it may concern:*

Be it known that I, EDWIN R. MOORE, a citizen of the United States, residing at St. Peter, in the county of Nicollet and State of Minnesota, have invented certain new and useful Improvements in Electrical Conducting Tramways and Trucks, of which the following is a specification, reference being had therein to the accompanying drawings.

My invention relates to an improvement in that class of devices for maintaining electric communication with a moving railway train or a balloon or air-ship in which two conducting guides or tramways are used, which support trucks which are connected by conducting-wires with an electrical apparatus carried by a car traveling upon a railway-track, by an air-ship sailing in the atmosphere, or by any other moving vehicle or vessel, so that a car or vehicle or air-ship may be furnished with electric motive power sufficient to propel it.

A system of tramways and trucks has heretofore been used in which the two trucks are connected and must travel upon parallel ways or guiding conductors; and if by any accident one or both of the guiding-conductors should become displaced by the falling or sinking of supports or otherwise one or both of said guides are liable to be broken or dragged from these supports, and the wires connecting the trucks with a car, balloon, or other vehicle are also likely to be broken and the entire system of communication rendered inoperative.

It has also been customary in inventions of this kind for one or more wheels and axles of the trucks to form essential portions of the conductors leading from the car or balloon; but they have been found not to be reliable, owing to the fact that the lubricators used for the journals of the wheel-axles render more or less imperfect the electrical contact of such journals with their bearings; and, besides, the traveling wheels themselves do not form a good contact with the guides.

The object of my invention is to overcome the disadvantages which I have mentioned, and also to improve the supports for the conducting guides or tramways; and to this end it consists in certain novel constructions, combinations, and arrangements, which will be hereinafter fully described, and particularly pointed out in the claims.

In the accompanying drawings, Figure 1 is a perspective view of a pair of conducting guides or tramways arranged on opposite sides of a railway-track and provided with separate trucks, each of which is connected by a conducting-wire with a car upon the railway-track. Fig. 2 is a vertical longitudinal section of one of the arms which support the conducting guides or tramways. Fig. 3 is a perspective view of one of the trucks. Fig. 4 is a section on line $x\,x$ of Fig. 3. Fig. 5 is a view of an air-ship in electrical connection with separate trucks arranged upon separate conducting guides or tramways. Fig. 6 is a partial section of a railway-car provided with a spring-reel for the attachment of one end of one of the conducting-wires, the other end of which is supposed to be connected with one of the trucks. Fig. 7 is an enlarged section taken in the plane indicated by the line $y\,y$ of Fig. 6.

Referring to Fig. 1, the letters A and A' indicate the electric conducting guides or tramways arranged upon the opposite sides of a railway-track, B, and supported at the ends of horizontal arms C, projecting from posts $c\ c'$ arranged along the side of the track, but not necessarily in rows parallel therewith, as it may frequently happen that the contour of the surface of the earth on one or both sides of the track may be unfavorable to the location of parallel rows of posts—as, for instance, in the drawings the posts $c'$ are located upon hilly ground.

The letters D D indicate separate trucks mounted upon the guides or tramways A A', and each connected by a conducting-wire, E, with the car F. The ends of the wires E connected with the car may be secured by the ordinary electrical binding-posts or any other of the well-known means of making fast ends of conducting-wires, and the ends of these wires may be connected in the ordinary manner with any suitable electrical apparatus upon a car. Instead, however, of connecting the ends of the wires E to rigid binding-posts or other rigid connections, I prefer to attach them to spring-reels located upon the car, as I will presently more particularly explain.

Referring to Fig. 3, each of the trucks D is provided with four wheels, G, arranged in two pairs, the peripheries of said wheels being grooved and one wheel of each pair being arranged above its fellow in the supporting-frame in which all the wheels are mounted. This supporting-frame consists of a top bar, H, a bottom bar, H', vertical connecting-bars $h$, connecting the ends of the bottom and top bars, vertical arms $h'$, and a back bar, $h^2$. The arms $h'$ are arranged in pairs, the upper and lower arms of which do not meet, but are separated a sufficient distance to allow the conducting guide or tramway to pass between them in the act of placing one of the trucks upon the tramway. The bars $h$ and the arms $h'$ are slotted longitudinally, and in the slots are arranged the journal-boxes I, provided with wing-pieces $i$, arranged in pairs on each side, and forming guides, which embrace the inner edges of the slotted bars and arms. Each of the journal-boxes has interposed between it and the end wall of the slot a spring, $k$, while on the other side of the box, and between it and the bar $h$, is arranged a spring, $k'$, so that the journal-box may yield slightly in both directions, or is elastically supported both above and below. The journals $g$ of the axles of the wheels G play upon the bearings $g'$, which may be arranged in the journal-boxes in any well-known manner, as likewise may be arranged the lids, I' of the journal-boxes, in order that they may be removed or raised for the insertion of the usual means of lubrication.

To the back bar, $h^2$, of the frame is firmly secured a metallic bar, L, the ends of which are bent forward and directly toward each other, each end of said bar being terminated by a metallic brush, $l$, the fine wires $l'$ of each brush projecting toward those of the other, and separated therefrom by such a distance that when one of the conducting guides or tramways is placed between the two brushes the fine wires of both brushes will come in contact with and closely embrace the said tramway. The bar L is provided with a ring, L', to which is to be connected the end of the conducting wire, which connects the truck with a railway-car or an air-ship, as the case may be.

In placing the truck upon the tramway the latter is passed laterally between the adjacent ends of the arms $h'$, and by forcing the wheels apart a little farther than their normal distance, the springs allowing them to yield, the tramway may be placed between the two wheels of each pair, which will hold it securely, owing to the pressure of the springs behind the journal-boxes. At the same time the tramway takes its place between the two brushes, $l$, the fine wires $l'$ of which yield to receive it, and spring up on each side of it so as to embrace it with an elastic pressure, giving a good electric contact. When the trucks are placed upon the two tramways and provided with the conducting-wires E, as shown in Fig. 1, said wires may, as before stated, be made fast to the car in any suitable manner; but I prefer to attach them to spring-reels, such as shown in Figs. 6 and 7.

The letter M indicates the casing of the reel, which may be secured to the side wall of a railway-car, and between the front and back walls of this casing is arranged a spindle, N, upon which fits the central sleeve, $p$, of the reel P, which is formed of a metallic circular plate having a laterally-bent flange, $p'$, from which extend outwardly two walls or rims, $q\,q$, between which is coiled the conducting-wire E, the inner end of which is connected electrically with the reel in any suitable manner, the wire being provided with any of the ordinary insulating covering.

The letter S designates a spiral spring similar to a strong clock-spring, which is coiled between the sleeve $p$ and the flange $p'$ of the reel. The inner end of the spring is firmly secured to the sleeve $p$, and its outer end is secured to a permanent post, R, projecting inwardly from the outer wall of the casing. Normally, and when the wire E is coiled thereon, the spring stands loose and without tendency to turn the reel; but when, from any cause, the truck to which the wire E is attached is retarded in its travel, or when it is carried farther than an ordinary distance from the car, owing to variations in the route taken by the guide or tramway on which it travels, the reel will be turned against the tension of the spring, owing to the strain upon the wire, and pay off a sufficient length of wire to allow the truck to overcome a temporary resistance or retardation, or to accommodate itself to a detour of the tramway; and when these causes operate for drawing off an unusual quantity of wire the reaction of the spring will turn the reel to wind up any slack which may occur in the wire, the tendency of the reel being, in fact, to keep the conducting-wire taut at all times with a yielding strain, so that it will not be broken by any sudden jerk or allowed to become slack and entangled in case a train should stop or move backward. It will be understood, of course, that a spring-reel will be used for each wire, which may be brought into electrical connection with the binding-post T by means of a metallic spring, $u$, one end of which bears against the back of the reel, while the other is connected to the shank of the binding-post, which projects through the wall of the casing. The binding-post T of the two reels will be connected by suitable wires with the opposite terminals of any suitable electrical apparatus arranged in the car; or the two reels may be used in the car of a balloon or air-ship from which lead separate conducting-wires. The wires leading from an air-ship, however, may be cabled or bound together in a common jacket, but separated for a sufficient distance from the trucks to allow said trucks to readily accommodate themselves to variations of route or distance between the two.

It is one of the main objects of my invention to obviate the necessity of parallelism between the two conducting guides or tramways, as it is extremely difficult to preserve such parallelism, and also quite difficult to cause two rigidly-connected trucks to run smoothly upon such ways, owing to their liability to take an oblique position and thus become jammed.

The truck may be made entirely of iron; but the frame is preferably made of wood in order that it may not too heavily weight the tramway. The tramway is preferably elliptical in cross-section, as shown at A in Fig. 2, and is supported by metallic straps V, each of which is bent around the tramway and clamped by a bolt, $v$, the arms of the strap extending along the arm C of the post and resting upon the shouldered insulating thimbles $v'$, which are inserted in the ends of passages formed through the arm C. Suitable bolts, $w$, pass through these passages and the thimbles and also through holes formed in the arms of the strap, and suitable nuts screwed upon these bolts hold the strap firmly against the thimbles, which keep it out of contact with the arm C. An insulating-tip, $v^2$, is placed upon the arm C in order to prevent the strap from coming in contact with said arm where the arms of said strap first begin to diverge.

Referring to Fig. 5, though I have shown the tramways to which the air-ship Y is connected as parallel, it will be understood that the distance between them may vary as much as desired.

I wish it to be understood that I do not limit myself to any particular construction of tramway in connection with my improved truck, as I may dispense with the insulator on the supporting-arms of the tramway and confine the tramways, by suitable straps or otherwise, direct to the ends of the arms. I prefer, however, to use the form shown, as being more certain to prevent leakage of the electrical current over the moist surfaces of the arms or posts in wet weather.

In practice I will use a dynamo-electric machine for generating the electric currents used, connecting one terminal of the machine to one of the tramways, and the other tramway being connected to the ground or the other terminal of the machine. Any suitable electric generator may, however, be used.

Upon the car, balloon, or other vehicle may be located any suitable electric motor so geared or connected with the impelling or propelling devices as to operate the same for driving the said car, balloon, or other vehicle.

The arms supporting the tramways may be supported by a single row of posts.

Having now fully described my invention, what I claim is—

1. As a means of transmitting electric currents to a moving railway-train or other vehicle, the suitably-supported insulated electrical conducting guides or tramways, the separate trucks arranged to travel upon said tramways independently of each other, and the conducting-wires E E, in electrical connection with the tramways through contacts supported by the trucks, substantially as described.

2. The truck D, having wheels G G G G, mounted, substantially as shown, in a frame provided with the metallic contact-brushes $l$, one or more, arranged for contact with a guide or tramway upon which the wheels travel, and having means for connection with a conducting-wire, substantially as described.

3. The truck composed of the top bar, H, bottom bar, H', slotted connecting-bar $h$, slotted arms $h'$, the back bar, $h^2$, the bent metal bar L, carrying the metallic brushes $l$, and the wheels G, mounted in spring-supported journal-boxes, substantially as described.

4. The combination, with the supporting-arm C and conducting guide or tramway A, of the strap V, bent around said tramway, the insulating shouldered thimbles $v'$, inserted in the passages through said arm, the bolts $w$, and suitable nuts for securing said bolts, substantially as described.

5. The combination, with two separate conducting guides or tramways, two separate and independent trucks traveling upon and in electrical connection with said conducting guides or tramways, and a railway-car traveling alongside said guides or tramways, of suitable spring-reels, mounted upon said car and adapted for electrical connection with a suitable electrical apparatus, and conducting-wires connecting said reels with said separate trucks upon the separate guides or tramways, respectively.

In testimony whereof I affix my signature in presence of two witnesses.

EDWIN R. MOORE.

Witnesses:
J. C. DONAHOWER,
EFFIE K. MOORE.